United States Patent [19]

Strobl

[11] Patent Number: 4,996,456
[45] Date of Patent: Feb. 26, 1991

[54] AXIAL RETAINERS FOR COATED ELECTROMAGNETIC ROTOR

[75] Inventor: Georg Strobl, Repulse Bay, Hong Kong

[73] Assignee: Johnson Electric S.A., La Chaux de Fonds, Switzerland

[21] Appl. No.: 444,201

[22] Filed: Dec. 1, 1989

[30] Foreign Application Priority Data

Dec. 2, 1988 [GB] United Kingdom ............... 8828162

[51] Int. Cl.$^5$ .................. H02K 15/02; F16B 2/00
[52] U.S. Cl. .................... 310/261; 310/42; 29/598
[58] Field of Search ............. 248/666; 310/42, 45, 310/261, 43; 403/259, 261, 371; 29/598

[56] References Cited

U.S. PATENT DOCUMENTS

| | | | |
|---|---|---|---|
| 3,844,031 | 10/1974 | Stone et al. | 310/42 |
| 4,377,762 | 3/1983 | Tatsumi et al. | 310/42 |
| 4,512,681 | 4/1985 | Hayhurst et al. | 403/371 |
| 4,697,114 | 9/1987 | Amemiya et al. | 310/261 |

FOREIGN PATENT DOCUMENTS

| | | | |
|---|---|---|---|
| 814988 | 9/1951 | Fed. Rep. of Germany | 403/261 |
| 142606 | 12/1976 | Japan | 310/42 |

Primary Examiner—Steven L. Stephan
Assistant Examiner—D. L. Rebsch
Attorney, Agent, or Firm—Fleit, Jacobson, Cohn, Price, Holman & Stern

[57] ABSTRACT

A rotor for an electric motor comprises a shaft having a laminated armature stack mounted thereon. A collar is fitted on the shaft at each end of the stack, and an epoxy resin coating coats the stack and bonds the collar to the shaft to fix the stack in position on the shaft. The collar may be formed by a cylinder which is split along its length and has an internal diameter equal to, or slightly less than the shaft diameter, so as to form a space between the shaft and collar and facilitate entry of the epoxy resin.

15 Claims, 1 Drawing Sheet

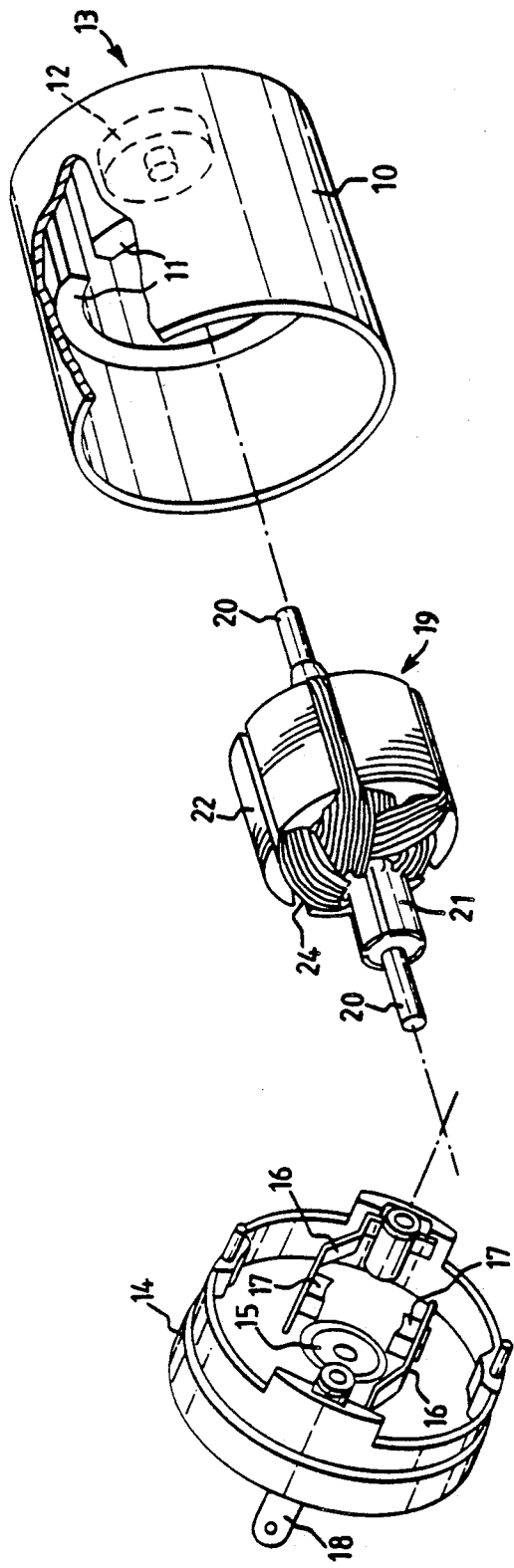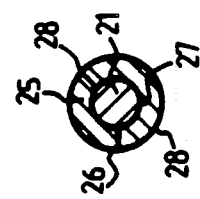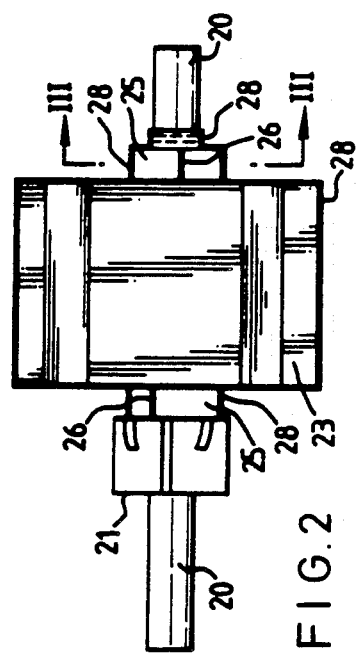

AXIAL RETAINERS FOR COATED ELECTROMAGNETIC ROTOR

INTRODUCTION

The present invention relates to a rotor in an electric motor, particularly in small Permanent Magnet dc (PMDC) motors, and a motor incorporating such a rotor.

BACKGROUND

Many small PMDC motors are used in automobiles and portable tools and are subject to harsh conditions. A fuel pump motor may be mounted on the engine block and subject to very severe G forces, sometimes up to 100G, while a larger motor may be used in a hammer drill and subjected to severe shock along the motor shaft. Forces of this magnitude can cause the laminated armature stack used in such motors to move relative to the motor shaft, thus affecting the performance of the motor.

SUMMARY OF THE INVENTION

A first aspect of the invention provides a rotor for an electric, the rotor comprising a shaft of the motor and a laminated armature stack and a collar mounted on the shaft, the collar abutting one end of the armature stack, wherein the collar is split radially on one side along its axial length and is formed from a cylinder having an internal diameter equal to or slightly less than the outer diameter of the shaft, whereby a space is formed between the shaft and collar, and the collar is glued to the shaft.

A collar could be force fitted on the shaft, but this leads to the risk of deforming the shaft during the force-fitting operation. The split collar is more readily mounted on the shaft and by forming the collar from a cylinder having a diameter less than that of the shaft the collar will grip the shaft to hold itself in position when it is first mounted, but, as it is distorted, will not touch the shaft around its full circumference.

Preferably the collar is held in place by a structural coating, such as epoxy resin, which also coats the armature stack, so bonding the collar to the shaft and the stack.

Preferably a collar is mounted at each end of the stack.

Other preferred features and advantages of the invention will be apparent from the following description and the accompanying claims.

BRIEF DESCRIPTION OF THE DRAWINGS

FIG. 1 is an exploded perspective view of a permanent magnet direct current motor embodying the invention;

FIG. 2 is a side view partly cut away of a rotor of the motor of FIG. 1 with the armature winding removed; and FIG. 3 is a cross-section along the line III—III of FIG. 2.

DESCRIPTION OF THE PREFERRED EMBODIMENT

FIG. 1 shows a fractional horsepower PMDC motor having a housing comprising a deep drawn can-like steel casing 10 carrying permanent magnets 11, and a bearing 12 in an end wall 13. The casing 10 is closed by a plastics end cap 14 which carries a bearing 15, two brushleaves 16 each carrying a brush 17 and two terminals 18 (one is shown) in electrical contact with the brushleaves 16. A rotor 19 of the motor comprises a shaft 20 and a commutator 21 and wound armature 22 mounted on the shaft 20. The armature 22 comprises a stack 23 of steel laminations which are a tight fit on the shaft 20 and a wire winding 24 wound about the arms of the armature and connected to the commutator 21.

In the assembled motor the shaft 20 runs in the bearings 12, 15, the end cap 14 closing the casing 10 and the brushes 17 bearing on the commutator 21.

The construction thus far described is well known in the art.

In use, the motor shown may be subject to high G forces along the shaft 20. Although the lamination stack 23 is a tight fit on the shaft 20, there is a tendency for the stack to creep along the shaft.

In accordance with the invention a collar 25 is fitted on the shaft 20 at each end of the lamination stack 23. The collars 25 abut the ends of the stack 23 and are formed from cylinders which have a split 26 radially on one side along their axial length (FIG. 3). The collars 25 have an internal diameter equal to, or preferably slightly less, than the outer diameter of the shaft 20 so that there is a slight clearance 27 between the collars 25 and the shaft 20 around part of the periphery of the shaft 20.

The collars 25 and lamination stack 23 are coated with a structural coating such as an epoxy resin 28 which will penetrate between the collars 25 and shaft 20 to bond the collars to the shaft and hence secure the lamination stack 23 against axial movement relative to the shaft 20. The epoxy resin is typically sprayed on as a liquid film and then cured.

The commutator 21 may be moved into position on the shaft 20 to abut a collar 25 before the coating 28 is cured.

Various modifications may be made to the described embodiment and it is desired to include all such modifications as fall within the scope of the accompanying claims.

What is claimed is:

1. A rotor for an electric motor, the rotor comprising a shaft of the motor and a laminated armature stack on the shaft and a collar mounted on the shaft, the collar abutting one end of the armature stack, wherein the collar is split radially on one side along its axial length and is formed from a cylinder having an internal diameter equal to or slightly less than the outer diameter of the shaft, whereby a space is formed between the shaft and collar, and a structural coating fills the space and glues the collar to the shaft.

2. A rotor as claimed in claim 1, wherein the structural coating coats the armature stack.

3. A rotor as claimed in claim 1, wherein a collar is provided at each end of the armature stack.

4. A rotor as claimed in claim 3, further comprising a commutator mounted on the shaft adjacent a collar.

5. A rotor for an electric motor, the rotor comprising a shaft of the motor and a laminated armature stack mounted on the shaft, wherein a collar which is split radially at one side along its axial length is mounted on the shaft adjacent an end of the armature stack and a structural coating bonds the stack and collar in a fixed position on the shaft, the unsplit collar having an internal radius slightly smaller than the outer diameter of the shaft so that a space is formed between the internal surface of the collar and the shaft the structural coating filling the space.

6. An electric motor including a rotor as defined in claim 1.

7. An electric motor including a rotor as defined in claim 2.

8. An electric motor including a rotor as defined in claim 3.

9. An electric motor including a rotor as defined in claim 4.

10. An electric motor including a rotor as defined in claim 5.

11. A permanent magnet direct current motor including a rotor as defined in claim 1.

12. A permanent magnet direct current motor including a rotor as defined in claim 2.

13. A permanent magnet direct current motor including a rotor as defined in claim 3.

14. A permanent magnet direct current motor including a rotor as defined in claim 4.

15. A permanent magnet direct current motor including a rotor as defined in claim 5.

* * * * *